US009372912B2

(12) United States Patent
Alasaarela et al.

(10) Patent No.: US 9,372,912 B2
(45) Date of Patent: Jun. 21, 2016

(54) METHOD, SERVER, DATABASE AND COMPUTER PROGRAM FOR ENRICHING COMPARISON DATA OF A DECISION MAKING APPLICATION

(71) Applicant: ZEF Oy, Oulu (FI)

(72) Inventors: Markku Alasaarela, Oulu (FI); Jaakko Alasaarela, Oulu (FI)

(73) Assignee: ZEF Oy, Oulu (FI)

( * ) Notice: Subject to any disclaimer, the term of this patent is extended or adjusted under 35 U.S.C. 154(b) by 155 days.

(21) Appl. No.: 14/201,024

(22) Filed: Mar. 7, 2014

(65) Prior Publication Data

US 2015/0254348 A1 Sep. 10, 2015

(51) Int. Cl.
*G06F 9/44* (2006.01)
*G06F 17/30* (2006.01)

(52) U.S. Cl.
CPC ............ *G06F 17/30592* (2013.01); *G06F 8/34* (2013.01)

(58) Field of Classification Search
CPC .............................. G06F 17/30592; G06F 8/34
See application file for complete search history.

(56) References Cited

U.S. PATENT DOCUMENTS

| | | | | |
|---|---|---|---|---|
| 5,341,478 A * | 8/1994 | Travis, Jr. | ................ | G06F 9/548 707/999.01 |
| 6,292,810 B1 * | 9/2001 | Richards | ............... | G06F 17/246 707/999.1 |
| 6,338,055 B1 * | 1/2002 | Hagmann | ......... | G06F 17/30448 |
| 7,693,743 B2 | 4/2010 | Alasaarela | | |
| 8,554,758 B1 * | 10/2013 | Larson | .............. | G06F 17/30336 707/673 |
| 2002/0049571 A1 * | 4/2002 | Verma | ..................... | G06F 17/50 703/1 |
| 2002/0174000 A1 * | 11/2002 | Katz | ................ | G06Q 10/06316 705/7.26 |
| 2002/0174049 A1 * | 11/2002 | Kitahara | ................ | G06Q 10/10 705/36 R |
| 2003/0182370 A1 * | 9/2003 | Alasaarela | ....... | G06Q 10/06398 709/204 |
| 2007/0150498 A1 * | 6/2007 | Li | ......................... | H04L 67/104 |
| 2009/0172773 A1 * | 7/2009 | Moore | ............... | G06F 17/3089 726/1 |
| 2010/0100561 A1 * | 4/2010 | Cooper | ............... | G06Q 10/067 707/769 |
| 2013/0211927 A1 * | 8/2013 | Kellogg | .................. | G06N 7/00 705/14.73 |
| 2014/0278832 A1 * | 9/2014 | Glavina | ............... | G06F 19/366 705/7.42 |

* cited by examiner

*Primary Examiner* — Chameli Das
(74) *Attorney, Agent, or Firm* — Andrus Intellectual Property Law, LLP

(57) ABSTRACT

A method, a server, a database and a computer program product by means of which comparison data of decision making applications can be enriched so that they may be utilized in other decision making applications. An application specific default database is first defined by selecting attributes to be assessed; selecting items to be compared; linking the selected attributes to the items by default attribute values and saving the defined default database of the decision making application to a global database. From the saved default attributes of items it is then calculated global attribute values to said items. The global attributes are then saved also to the global database. A second decision making application may be converted from the global attributes by first selecting a sub-group of items from all items of the global database. Then global attributes of items of the sub-group are converted to the local attributes, whereby speeding up creation of the second decision making application.

13 Claims, 10 Drawing Sheets

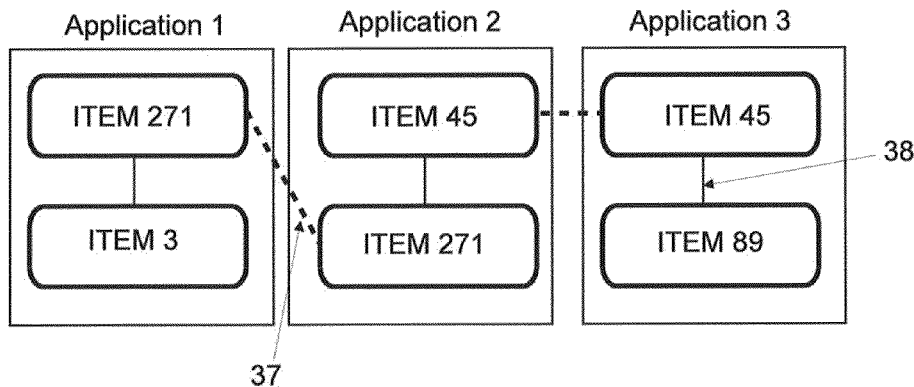
Fig. 3c
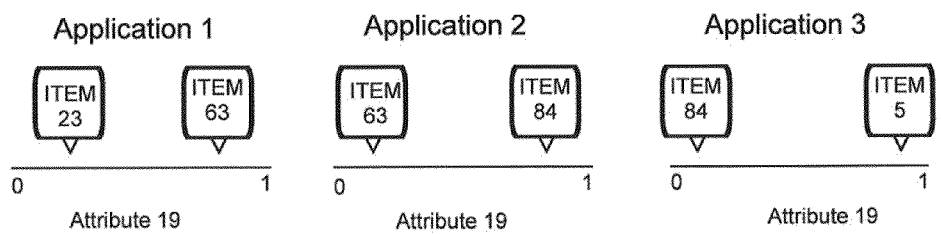
Fig. 4a
Table 1: Values of Attribute 19
|        | Application 1 | Application 2 | Application 3 | Global value |
|--------|---------------|---------------|---------------|--------------|
| Item 23 | 0.2 |      |      | 0.013 |
| Item 63 | 0.8  | 0.23 |      | 0.051 |
| Item 84 |      | 0.85 | 0.19 | 0.19  |
| Item 5  |      |      | 0.9  | 0.9   |
Fig. 4b

METHOD, SERVER, DATABASE AND COMPUTER PROGRAM FOR ENRICHING COMPARISON DATA OF A DECISION MAKING APPLICATION

FIELD

The invention relates to a method for enriching comparison data of decision making applications, by which an application user makes decisions by utilizing at least one evaluation frame. The invention relates also to a server, a computer program and a database utilized in the method.

BACKGROUND

Comparing of two or more evaluation items or targets can be implemented by utilising some decision making application implemented in a data network. The decision making application is sometimes called also a comparator. After utilizing a decision making application a person can make a selection that is based on features of the items that have been assessed. A target of the comparison may be for example a product, a service, a travel destination, a person etc. The purpose of the comparison is to produce a final result, on the basis of which a target can be presented to a person performing the comparison from several alternative comparison targets, which target best corresponds to the needs and desires of the person performing the comparison with regards to the properties used in the comparison, which describe the comparison target.

Below are depicted some examples of decision making applications developed by ZEF Oy. The decision making applications below may be utilized when making personal decisions in different situations.

VotingAid®:

VotingAid® is a decision making application that may be also called a voting advice application. VotingAid® helps people make more educated decisions in elections. VotingAid® facilitates an individual voter in choosing a candidate that best matches the voter's needs.

In VotingAid® a creator of VotingAid® application prepares questions about important political issues to be utilized in VotingAid®. When the questions are ready the VotingAid® creator sends to candidates invites to give answers to the questions of VotingAid®. If the candidate wants to participate in the VotingAid® query he or she gives his or her answers to the questions of VotingAid®. When at least most of the candidates have answered the questions the VotingAid® creator publishes the prepared VotingAid® in Internet.

After the VotingAid® has been published the voters may answer these same questions as the candidates and his or her answers are compared to corresponding answers of the candidates. VotingAid® shows which one of the candidates has most similar opinions compared to the opinions of the voter. That way the voter can find out which one of the candidates is the best choice for him or her in the election.

eSalesman™:

eSalesman™ has features that are very similar to the VotingAid®. In eSalesman™ products or other items of at least one product or service supplier are compared between each other instead of candidates of VotingAid®.

Also in eSalesman™ an application creator creates questions about important issues to be used when a comparison between selected items is performed in eSalesman™. The application creator selects also items to be included to the present eSalesman™. When all questions and items to be assessed in the eSalesman™ are selected the application creator defines also for each question default attributes and item specific attribute values that are associated with the items.

When the default attributes for each question of all items are ready the application creator publishes the decision making application in Internet. Sometimes the creator of eSalesman™ may be called also as a reference user because he or she in a way classifies the items of eSalesman™.

When a user of eSalesman™ answers to questions his or hers answers are compared to the default attributes of items that the user has selected in eSalesman™. eSalesman™ is capable of showing which one of the selected items has most similar attribute values compared to user's answers. That item seems to match best user's requirements and expectations.

Both in VotingAid® and eSalesman™ the answers to the questions may be given by a one-dimensional evaluation line. An example of a possible evaluation line is shown in FIG. 1a. In the exemplary one-dimensional evaluation line 1 a question concerning customer satisfaction of a particular company is asked. An exemplary opinion/evaluation 2 of the user is presented on the evaluation line in FIG. 1a. In the example of FIG. 1a the left end of the evaluation line illustrates a situation where the user of the decision making application has negative a feeling about the exemplary company. The right end of the evaluation line in FIG. 1a illustrates a situation where the user of the decision making application has positive feelings about the company and almost completely agrees with the presented statement. The evaluation given by the user of the decision making application regarding the presented statement can be compared to attribute values of several different items or targets that are included in the present decision making application. By proceeding thus it is possible to calculate congruence between the evaluation given by the decision making application user and each comparison item. The congruency may be converted as an accuracy percentage.

Survey:

Survey is similar to VotingAid® or Salesman™ but without default attribute values of the items. There are only questions for the users who can answer the questions by utilizing a stepless graphical two-dimensional inquiry frame that is called a fourfold. An example of a graphical two-dimensional evaluation frame is shown in FIG. 1b.

As an example of comparators may be mentioned a two-dimensional on-line comparator that is presented in U.S. Pat. No. 7,693,743. The patent presents a data collection and presentation method that functions in a data network, where a stepless two-dimensional data collection, evaluation and presentation manner is utilized for collecting customer needs and presenting a comparison result that is calculated from the customer needs. The evaluation results are normalized, so that the average of all evaluation points of the evaluator entered into the fourfold is set in the origin and the deviation is set to a standard value. With the described method the given responses can be scaled so that the customer's order of importance of different properties of the evaluation target are detected from the inquiry results, even if the responses given by the customer of the properties being evaluated were to be concentrated close together.

Above mentioned decision making applications may give a person or company valuable information when used. However, information from each above mentioned decision application is managed independently nowadays. Therefore, there is a need for a solution where already existing comparison data about utilized items and their attributes of earlier decision making applications could be utilized for speeding up creation of a new decision making application.

SUMMARY

An object of the invention is to present a method and system for enriching and speeding up creation of a new decision making application from items and attribute data of existing decision making applications that have been saved to a global database.

An advantage of the invention is that with the method according to the invention a creator of a new decision application can speed up creation of a new decision making application by utilizing already existing linked attribute and item data existing in the global database.

A further advantage of the invention is that a creator of a decision making application can directly convert from data of the global database a more concise local database to be utilized in a new decision making application.

A further advantage of the invention is that a creator of a decision making application can include as such to the decision making application under construction items and theirs attribute data extracted from the global database.

A further advantage of the invention is that also a user of decision making applications can create from his or her saved answers to one or more decision making applications that are saved in his or her personal database a new decision making application by utilizing local attribute values that are converted from personal global database.

According to the first aspect of the present invention a method for enriching comparison data of decision making applications is provided comprising:
    defining in a development environment a first decision making application by defining an application specific default database by selecting attributes to be assessed; selecting items to be compared; linking the attributes to the items by default attribute values; and saving the defined default database of the first decision making application to a global database; and
    calculating in the global database from linked default attribute values of items of decision making applications included in the global database global attribute values to said items; and converting from the global attributes at least one local attribute to be included in a second decision making application, which has at least one attribute or item linked to an existing attribute or item in the global database whereby speeding up creation of the second decision making application.

According to the second aspect of the present invention a server is provided comprising a processor unit; a memory unit; input and output means, and a user interface; where the processor unit and the memory unit configured to:
    implement a development environment that is configured at least to define an application specific default database of a first decision making application by enabling selection attributes to be assessed; enabling selection items to be compared; enabling linking the attributes to the items by default attribute values and enabling saving the defined default database of the first decision making application to a global database;
    calculate from linked default attribute values of items of decision making applications included in the global database global attribute values to said items; and
    convert from the global attributes at least one local attribute to be included in a second decision making application, which has at least one attribute or item linked to an existing attribute or item in the global database whereby speeding up creation of the second decision making application.

According to the third aspect of the present invention a computer-readable non-transitory data storage medium including a computer program for enriching comparison data of decision making applications is provided comprising:
    computer readable code for defining a first decision making application by defining an application specific default database by selecting attributes to be assessed; selecting items to be compared; linking the attributes to the items by default attribute values and saving the defined default database of the first decision making application to a global database;
    computer readable code for calculating from linked default attribute values of items of decision making applications included in the global database global attribute values to said items; and
    computer readable code for converting from the global attributes at least one local attribute to be included in a second decision making application, which has at least one attribute or item linked to an existing attribute or item in the global database whereby speeding up creation of the second decision making application.

According to the fourth aspect of the present invention a database is provided comprising:
    a plurality of items of decision making applications, each item representing an object included in a comparison process;
    a plurality of attributes of the items with associated default attribute values;
    a plurality of links between items and associated attributes;
    a plurality of global attribute values of the items that are defined from the default attribute values of the items; and
    a plurality of local attribute values of a sub-group of items of the database, which local attribute values are defined from the global attribute values of all items; whereby a creation of a decision making application is speeded up by utilizing the defined local attributes of items in a decision making application development environment.

Some advantageous embodiments of the invention are presented in the dependent claims.

The basic idea of the invention is the following: A decision making creator defines a default decision making application database by selecting items to be compared, questions to be asked about the items and associating attributes to the items by defining item specific default attribute values. An attribute of one particular item includes one or more numerical attribute value in the scale from 0 to 1. The defined items and their attributes are advantageously saved to a global database according to the invention. The global database includes items, their default attributes and attribute values of several existing decision making applications.

Items in the global database having at least one common feature may advantageously be linked to each other by calculating for these items global attribute values according to the invention. For calculating a global attribute value of a particular item the items of different decision making applications are first arranged into a case specific order that is based on the common feature. The order of items may be an order of magnitude of the items, for example. It is evident that also other ordering criteria of the items may be utilized.

After that an item specific adaption factor is applied to the original attribute value of a particular item for calculating one global attribute value for that particular item. In the example above, the smallest in size of all original items has after adaption the smallest global attribute value advantageously in the scale from 0 to 1. The biggest one of the original items may retain its original numerical value in the same scale in the global database or may be set for example to value 1. The other remaining items have one global attribute value that is between the global attribute value of the smallest item and the global attribute value of the biggest item. The defined global attribute values for all items are advantageously saved in the global database as global attribute values of those particular items. In that way the items from different decision making applications may be linked to each other by the calculated global attribute values.

A creator of a new decision making application may utilize existing items and attributes of other decision making applications that have been linked and saved in the global database according to the invention.

If one or more linked items that have a global attribute value should be utilized in another new decision making application (i.e. a sub-group of all items) a set of local attributes may advantageously be converted from the set of global attributes of those items. In the converted local attributes of the selected items the item having the smallest global attribute value may advantageously be converted for example to a new local attribute value 0. Respectively the item having the biggest global attribute value may be converted for example to a new local attribute value 1. The remaining items that should be included as items to the new decision making application have may also be converted to local attribute values that are bigger than 0 but smaller than 1.

By utilizing the global database a creator of a decision making application can speed up creation of a new decision making application by omitting a need to define attributes and their values by him or herself because the attribute values of the new decision making application can be converted from the global attributes of the selected items by one action.

BRIEF DESCRIPTION OF THE DRAWINGS

In the following, the invention will be described in detail. In the description, reference is made to the appended drawings, in which FIG. 3c shows an example of linking of items between three decision making applications, FIG. 4a shows an example of three decision making applications where same items having different attribute values are utilized, FIG. 4b shows as an example how global attributes of the items of FIG. 4a are defined.

DETAILED DESCRIPTION OF THE DRAWINGS

Figure 1A:
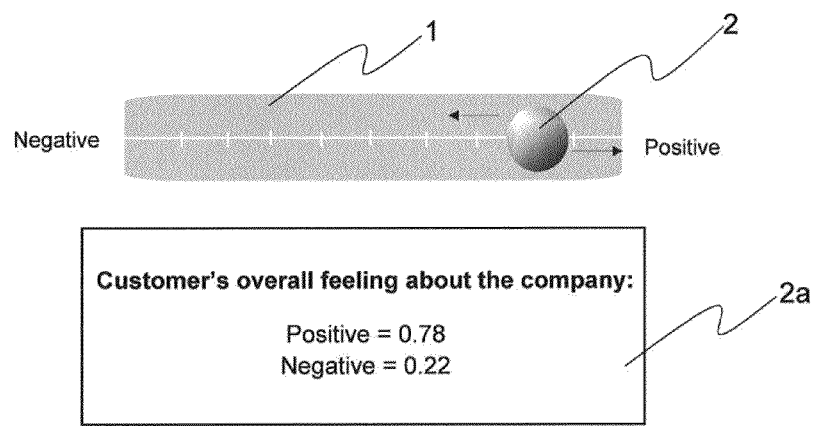
FIG. 1a shows an example of one-dimensional evaluation line according to prior art.

In the following description, considered embodiments are merely as an example, and one skilled in the art may find other ways to implement the invention. Although the specification may refer to "an", "one", or "some" embodiment(s) in several locations, this does not necessarily mean that each such reference is made to the same embodiment(s), or that the feature only applies to a single embodiment. Single feature of different embodiments may also be combined to provide other embodiments.

In the following description items, attributes, attribute values and hashtags of decision making application are depicted. Later in this description a decision making application may also be called "an application"

Attributes are generally very much like adjectives. Attributes are components to questions used in decision making applications. By answering a question a user may generate values to multiple different attributes used in the question. New attributes can also be generated from existing attributes by combining different attributes with one new attribute.

Decision objects or targets are called items in the following description. In VotingAid® application items are candidates. In eSalesman™ these items can be for example products, personality types, animals, vehicles, hobbies, financial advices, and environmental recommendations. Items have some general features like: name, description, image, url, tags, EAN Code, etc.

An application creator also adds default attribute values to different attributes that are associated with utilized items in application. Attribute values may be added by answering questions as an opinion about their essence. Attribute values may be added also based on their real world factors and numbers. In the examples of this application attribute values may have a numerical value between 0 and 1. However, the invention is not limited to a numerical scale from 0 to 1 but also other numerical scales may be utilized when defining attribute values.

In VotingAid® candidates, that are also items in this environment, usually answer the questions of VotingAid® by himself or herself. In some cases others can answer as a candidate by using information from candidate's public agendas.

As items may have associated attribute values, the items may also be used as attributes. Therefore a user may use an item later as a search term or descriptive attribute. For example, a very well-known car type may be used for depicting quality features that generally are connected with that car type.

Data associated with a decision making application may be tagged for better search ability and to increase its usability in different purposes. This may be accomplished for example by utilizing hashtags (#). Hashtags may be added to the decision making applications themselves, to the questions of decision making applications and to particular items. Usually it marks out a context of the attribute for later use. When a hashtag is used in a decision making application it will be added to all attributes and items inside that particular decision making application.

Some examples of hashtags uses:
GOPPrimary2012 ("Grand Old Party"—Primary elections in 2012)
MickeyMouse (It can describe the target audience)
2012 (It can describe time)
USA (It can describe location)

Figure 1B:
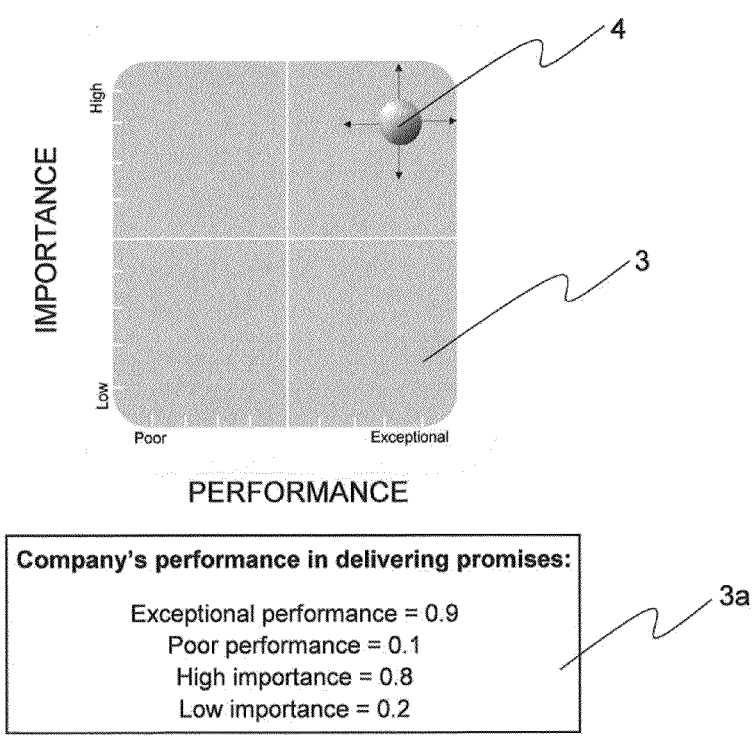
FIG. 1b shows an example of two-dimensional evaluation frame according to prior art.

FIGS. 1a-1b are partly described in connection with the description of prior art.

In FIG. 1a it is depicted how by utilizing an one-dimensional evaluation line 1 may be answered to a question about customer satisfaction of a particular company. The exemplary opinion/evaluation 2 of the user is presented on the evaluation line 1 in FIG. 1a. In the example of FIG. 1a the left end of the evaluation line 1 illustrates a situation, where the user of the decision making application has negative feeling about the exemplary company. The right end of the evaluation line 1 in FIG. 1a illustrates a situation, where the user of the decision making application has positive feelings about the exemplary company.

The evaluation 2 given by the user of the decision making application regarding the presented statement generates attribute data that is depicted in an attribute table 2a. The user has made an evaluation that has generated an attribute data, which includes two attribute values. The first attribute value "Positive" has a numerical value 0.78. The other attribute value "Negative" has a numerical value 0.22.

Another example about an evaluation case may be a situation where a bicycle buyer wants to buy a bicycle. In the first question the buyer has to evaluate which one a gearshift bicycle or a normal bicycle he or she prefers. Also in this case two attribute values may be generated from one question. The evaluation may generate for example following attributes: a gearshift bicycle has an attribute value 0.7 and normal bicycle has an attribute value 0.3.

The buyer evidently has also other criteria that he or she uses when making a final buying decision about the bicycle. By continuing selection from one or the other of the alternatives of the first question, in another question the item selected after the first question (either gearshift bicycle or normal bicycle) may carry along its attribute value either 0.7 or 0.3 to the next item of the decision making application.

FIG. 1b shows an example of a question fourfold 3 that may also be utilised in a decision making application. The user of the question fourfold moves stepless a response cursor 4 to a desired point in the question fourfold 3. This stepless aiming possibility has been illustrated with four arrows pointing out from the cursor 4. When the response cursor 4 is according to the user in a point which corresponds to user's opinion or evaluation with regards to the two properties shown in the fourfold, the user locks the response cursor 4 with a function related to the data processing device he or she uses.

The locking of the answer generates in this example attribute data that comprises following four attribute values: Exceptional performance 0.9, Poor performance 0.1, High importance 0.8 and Low importance 0.2. These attribute values are shown in the attribute table 3a.

Figure 1C:
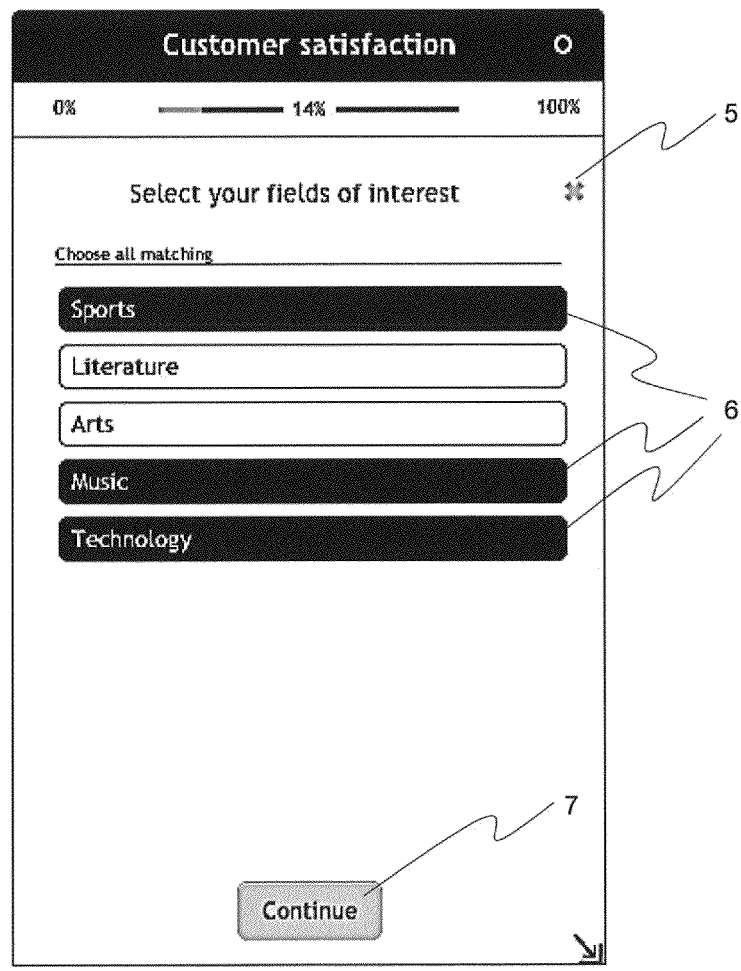
FIG. 1c shows an example of multiple choice question frame according to prior art.
Figure 1C:
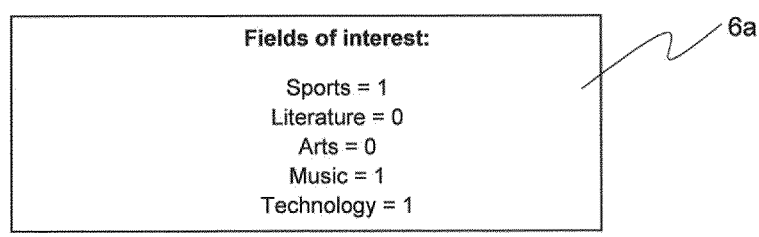

FIG. 1c shows an example of a multiple choice question frame 5. The user may select from depicted alternatives one or more interesting targets 6. In this example the user has selected Sport, Music and Technology as being interesting for him or her. These selections generate attribute table 6a where Sports, Music and Technology have attribute value 1. Alternatives Literature and Arts are not selected and therefore they have attribute value 0.

Figure 2A:
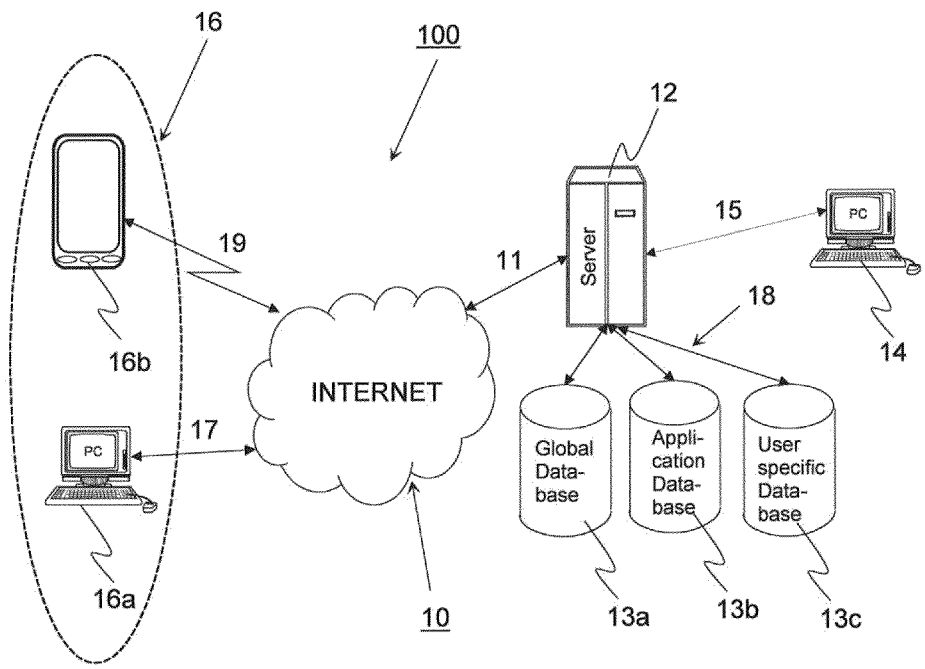
FIG. 2a shows as an example a decision making application environment according to the invention.

FIG. 2a shows as an example a decision making application environment 100 according to the invention. Users of the decision making applications connect via the Internet 10 to a server 12, wherein computer software which implements the functions of the decision making applications has been installed. Each user can open from the server 12 one or more decision making application functioning therein via a www-page that can be found on the server.

FIG. 2a shows also as an example two data processing devices 16a and 16b, which the user of the decision making application can utilize. Reference 16a shows a conventional computer, which is connected to the Internet 10 via a fixed data communication connection 17. Reference 16b shows as an example a wireless device connected to the Internet via a wireless data transfer connection 19. The wirelessly functioning device 16b may for example be a terminal of a cellular network, a palmtop computer or a portable computer equipped with a WLAN feature. When it is desirable to use a certain decision making application, the www-page of that decision making application available on the server 12 is opened on the utilized data processing device. A response is given to the question of the decision making application by using a graphic user interface of the decision making application which opens on the screen of the data processing device 16a or 16b. Each individual question fourfold, comparison line or multiple choice question frame opens up in the decision making application as a new www-page.

The server 12, wherein the computer program implementing the decision making application is installed, is advantageously connected with a fixed data transfer connection 11 to the Internet 10.

A computer 14 which the creator of the decision making application utilizes for defining questions items and default attributes associated with the items of the decision making application is connected to the server 12 advantageously either with a fixed data transfer connection 15 or with a wireless communications network.

The server 12 has also connections 18 to three advantageously distinct databases 13a, 13b and 13c. Computer 14, server 12 and databases 13a, 13b and 13c build up a development environment or platform for facilitating creation of new decision making applications from linked items and their attribute data of already existing decision making applications.

On the other hand when a user of a decision making application answers to questions of the utilized decision making application his or her answers may be saved to a user specific database 13c. Assessed items are linked to attributes by attribute values that the user has given by answering the questions. That user specific database 13c includes only evaluation data that has originated from the actions of that particular user. This database 13c is in a way personal database restricted from other users or application owners.

In the same time, when decision making application data of the user is saved to the personal database 13c, items and generated attribute values of the utilized decision making application may be saved anonymously to an application database 13b that belongs to an owner of the decision making application. In that way the application database 13b includes anonymous item and attribute data of one particular decision making application of several users. The items and attributes may be linked between different users for enriching the data network of a particular decision making application.

In FIG. 2a it is also depicted a third database according to the invention that is called Global database 13a. It functions as a platform where the linking functions of the present invention between items and attributes of several decision making applications are saved. To the Global database 13*a* may be saved data from several distinct decision making applications that advantageously have been executed in the server 12. The utilized items and their attribute data and their user generated links from the personal database 13*c* are saved anonymously in Global database 13*a*. However the server 12 has program means by which items and their attribute data from different decision making application can be linked in Global database 13*a* in such a way that a new decision making application can be created by utilizing the linked data of Global database 13*a*.

Figure 2B:
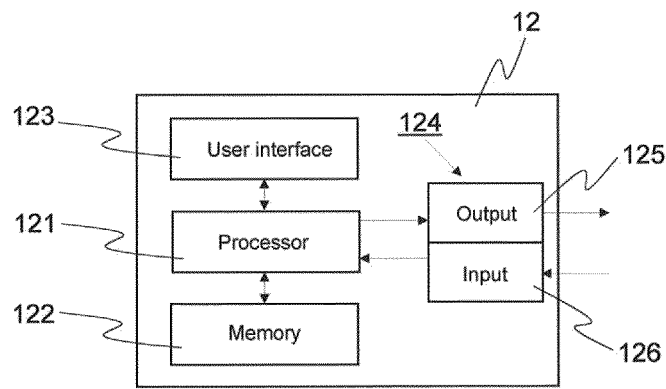
FIG. 2b shows as an example a server utilised in the implementation of a decision making application environment according to the invention.

FIG. 2*b* shows the functional main parts of the server 12 utilized in the implementation of the linking and calculation functions utilized in the present invention. The server 12 comprises a processor or processor means 121, which comprise an arithmetic logic unit, a number of different registers and control circuits. A data storing arrangement 122 such as memory unit or memory means, whereon computer-readable information, programs or user data can be stored, has been connected to the processor means 121. The memory means 122 typically contain memory units, which allow both reading and writing functions (Random Access Memory, RAM), and memory units containing non-volatile memory, from which data can only be read (Read Only Memory, ROM).

The server 12 also comprises an interface element 124, which comprises an input or input means 126 for receiving data from the data communications network 10 from the processing devices 16*a* and 16*b* of users of decision making applications, from the data processing device 14 of the application creator or from the separate databases 13*a*, 13*b* or 13*c*. The data received with the input means 126 is transferred to be processed by the processor means 121 of the server 12. The interface element 124 of the server 12 also comprises an output or output means 125, with which data is transferred from the processor means of the server 12 either via a data transfer network 10 to the data processing devices 16*a* and 16*b* of the user of the decision making application or to the data processing device 14 of the application creator.

The server 12 advantageously also comprises a user interface 123, which comprises means for receiving data and/or control commands from the administrator of the server 12. The user interface 123 can for example comprise a keyboard, a touch screen, a microphone and a speaker.

The processor means 121, the memory means 122, the interface element 124 and the user interface 123 are electrically joined together to systematically execute received and/or stored data or information in accordance to predetermined and essentially pre-programmed operational sequences. Such operational sequences also include the operational sequences described in connection with FIGS. 6*a* and 6*b*, which operational sequences implement the functions of the present invention. The detailed implementation of the logical units of the server in FIG. 2*b* are prior art to a person skilled in the art.

In an advantageous embodiment of the invention a part of the server's 12 memory 122 may be reserved for above depicted databases 13*a*, 13*b* and 13*c*.

Figure 3A:
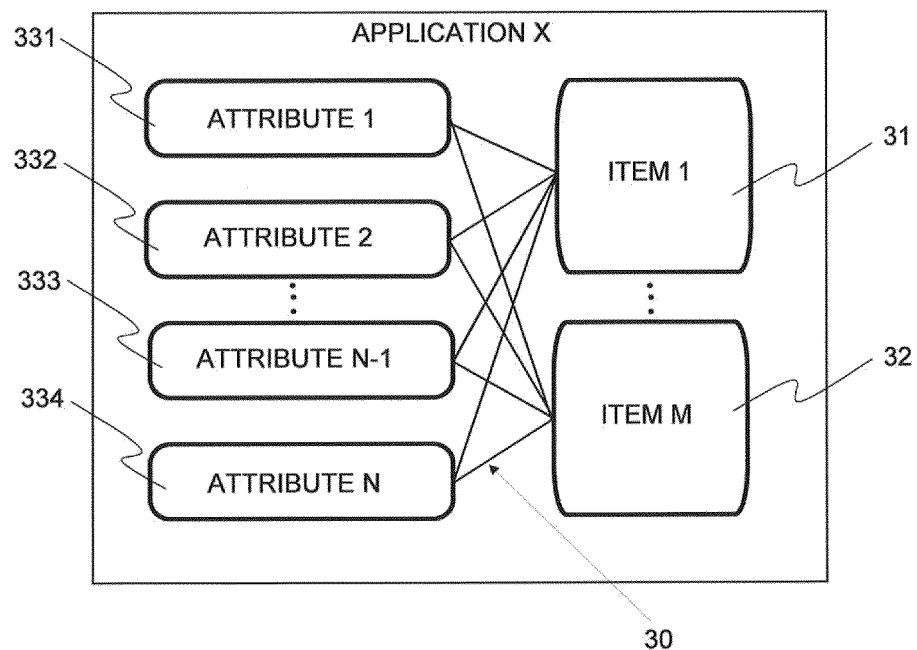
FIG. 3a shows as an example linking of items to attributes in one decision making application.

In FIG. 3*a* it is depicted as an example links between items and attributes of an exemplary decision making Application X. The exemplary attributes comprises N pieces of attributes from attribute 1 (reference 331) to attribute N (reference 334).

In the example of FIG. 3*a* the decision making application X comprises also M pieces of items from item 1 (reference 31) to item M (reference 32). In this example all M items of the decision making application X have advantageously been linked to attributes 1, 2, . . . , N−1 and N (reference 30).

When a decision-making situation generates a link between a particular attribute and item also a numerical value arises for depicting that relationship. It can be described also as "How well that attribute describes item?", "How true it is that item has that attribute?", "How well the item represents that attribute?"

Figure 3B:
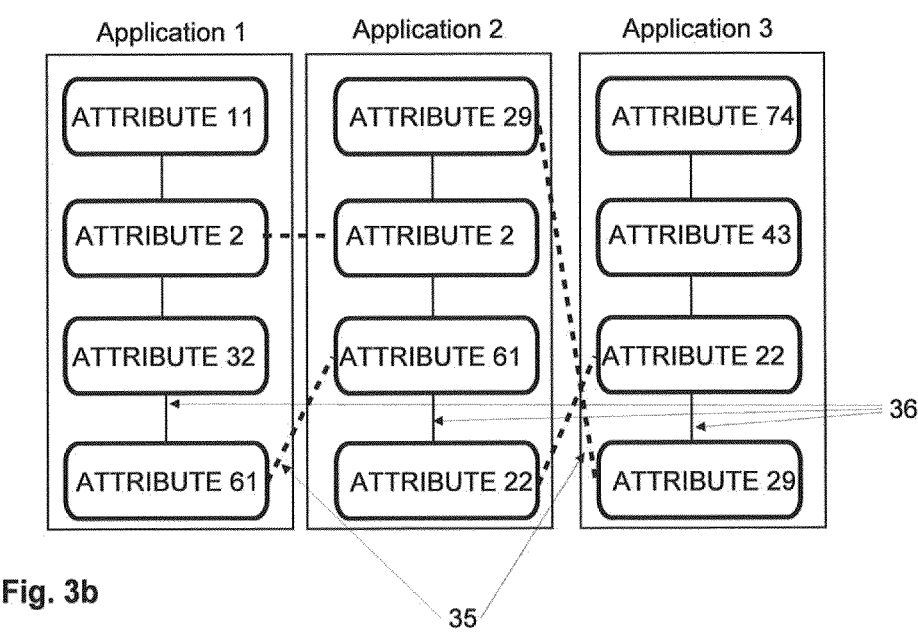
FIG. 3b shows an example of linking of attributes between three decision making applications.

In FIG. 3*b* it is depicted as an example links or relationships between attributes. A link between two attributes may be either inside a particular decision making application or also between two or more distinct decision making applications.

If there is more than one question or more than one attribute in a decision making application natural links between different attributes are created in a database of the decision making application in question. A link between attributes can be explained for example as follows:

Attributes are used to some specific decision making situation (hashtags)

Attribute can have if/then conditions to other attributes via user's answers because the users have answered questions at the same time (i.e. in the same decision making situation).

FIG. 3*b* includes as an example three decision making applications 1, 2 and 3. The Application 1 discloses attributes 11, 2, 32 and 61 which are linked (reference 36) to each other inside the application 1.

The Application 2 discloses attributes 29, 2, 61 and 22 which are linked (reference 36) to each other inside the application 2.

The Application 3 discloses attributes 74, 43, 22 and 29 which are linked (reference 36) to each other inside the application 3.

In the example of FIG. 3*b* some of the attributes are also utilized in another decision making application. Attributes 2 and 61 are utilized both in Application 1 and Application 2. Attributes 29 and 22 are utilized both in Application 2 and Application 3.

When same attributes are used in different decision making applications they will be handled as same attributes. They might have different hashtags but generally it is a question of the same attribute. This creates new second level links between attributes that probably were not linked before. If/then conditions may be used to exploit this link.

For example in a survey context an application creator can look at what some specific kind of users might have answered to other attributes. The creator can estimate how correlated used attributes are to other attributes that was not included in application creator's application.

In FIG. 3*c* it is depicted as an example links between items. Items have similar links to each other as attributes have. They may have links inside one decision making application (for example between two different items 271 and 3 in Application 1) or between two decision making applications (for example same item 271 between Application 1 and Application 2).

When there is more than one item in a decision making application, those items have links inside that particular decision making application. This link inside the decision making application may be used to specify similarities between items. Hashtags are one very good way to link specific items used in same decision-making situations.

Items can have links between applications similarly as attributes. If the same item is used in different applications it is handled as one item.

This link can be used for example to measure relationships between items.

An example of linking items in three decision making applications: In FIG. 3*c* Application 1 may be VotingAid® having two candidates Item 3 and Item 271. Application 2 may be a particular eSalesman™ application of the candidate called Item 271. This eSalesman™ sells campaign material of Item 271. One sales object may be a T shirt (Item 45). The same T shirt (Item 45) is available also via a second eSalesman™ of a clothing store. This eSalesman™ includes also shoes, for example also a particular sporting shoe model.

It can be seen in FIG. 3*c* that in the Application 1 there is a direct link between the candidates (Items 3 and Item 217). However from the Item 3 (candidate 1) is a five step link via Item 271 (candidate 2) and via two different eSalesman™ applications to the particular sporting shoes (Item 89).

Figure 3D:
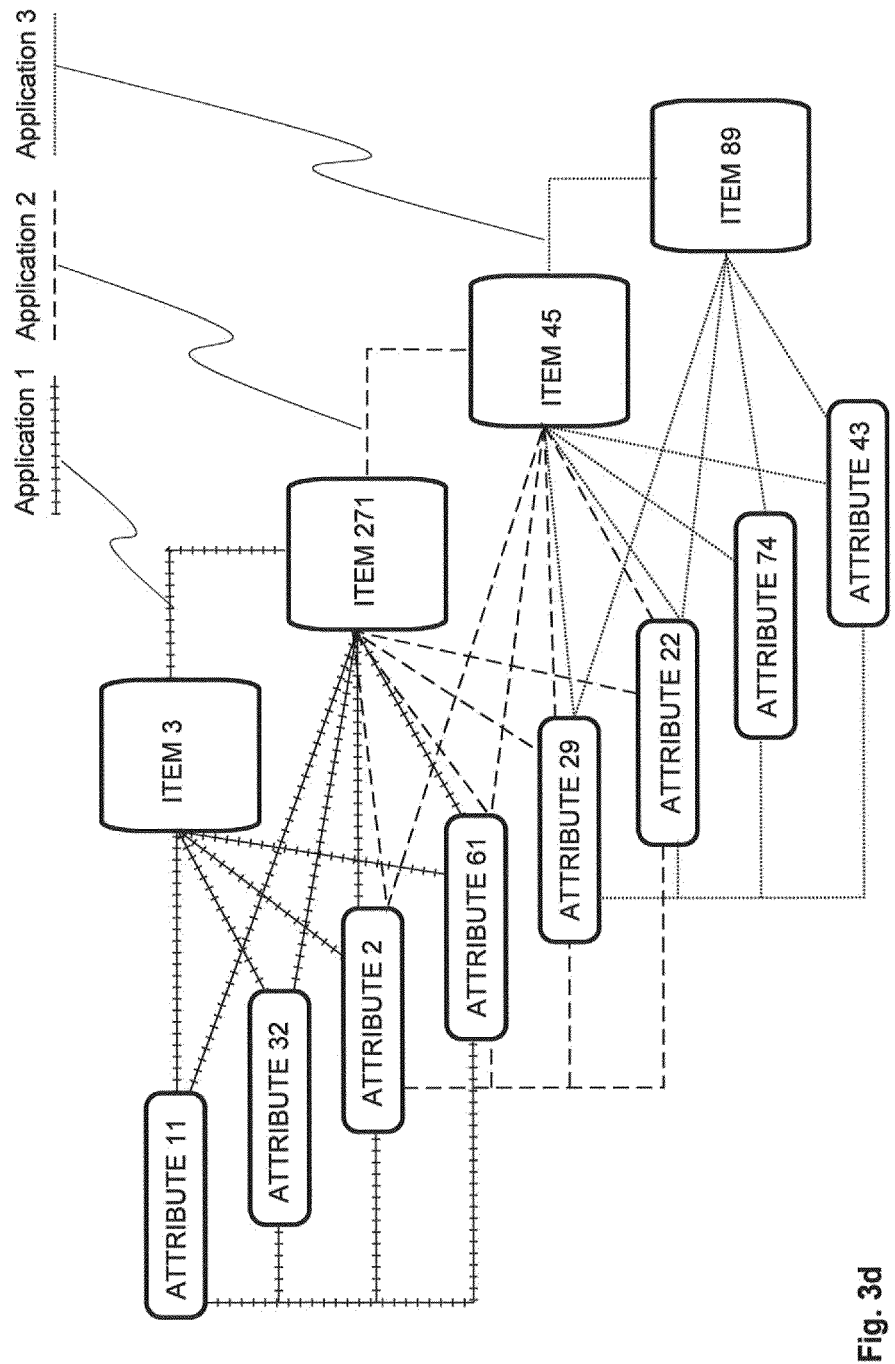
FIG. 3d shows an example of linking of attributes and items between three decision making applications.

FIG. 3*d* shows as an example links between items and attributes of three decision making applications 1, 2 and 3 of FIGS. 3*b* and 3*c*.

Links between items and attributes due to Application 1 are depicted with a solid line having cross-lines. Links between items and attributes due to Application 2 are depicted with a dotted line having a long pitch. And links between items and attributes due to Application 3 are depicted with dotted line having a short pitch.

In FIG. 3*d* items and attributes are linked straight to each other or via other items or attributes. Almost every item or attribute in this example has some kind of connection to one other attribute or item. Therefore, these links create an information network in Global database 13*a* according to the invention. In the created information network numerical data behind these connections between items and attributes can be exploited in numerous ways.

Figure 3E:
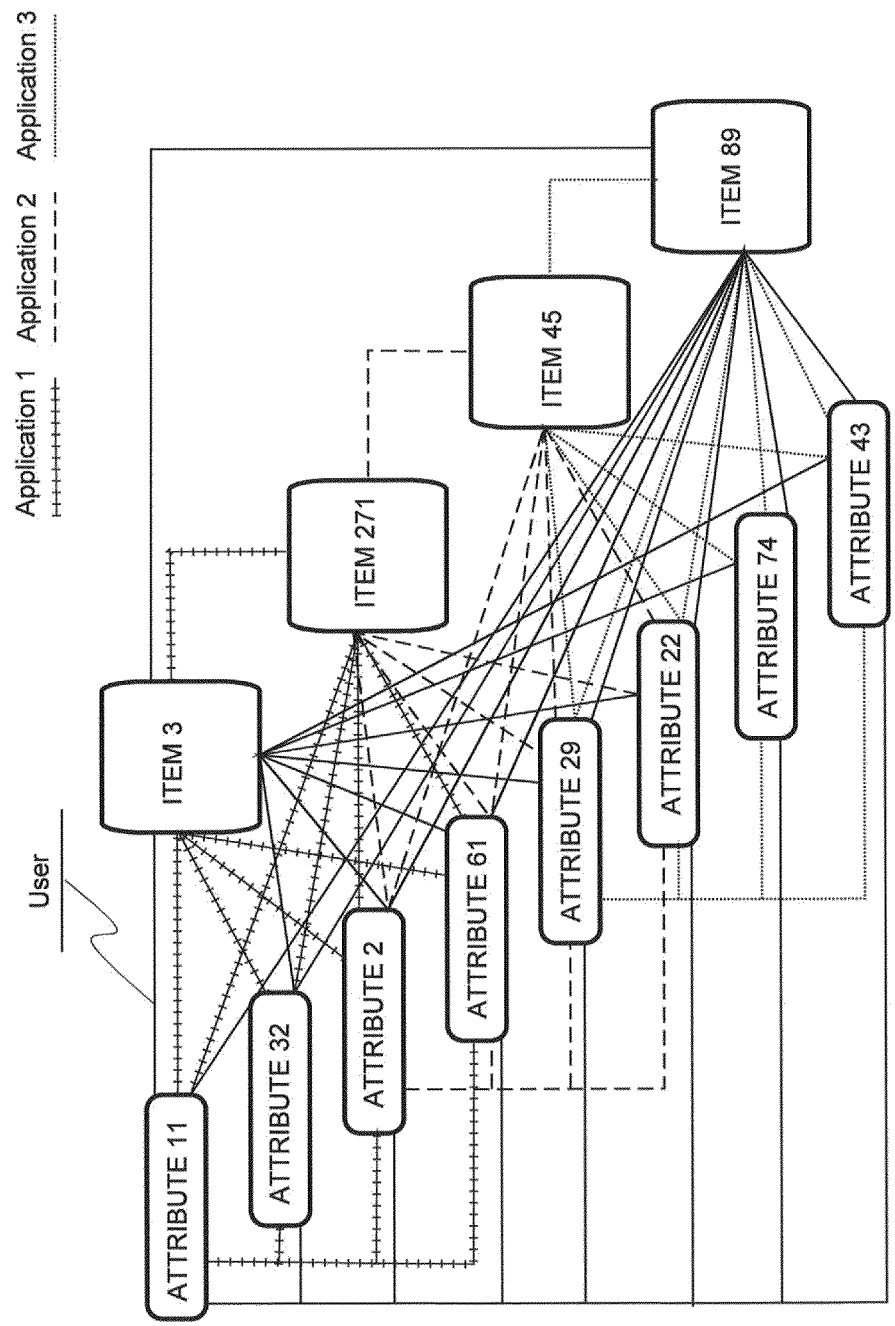
FIG. 3e shows an example of linking of attributes, items between three decision making applications and a user link to them.

FIG. 3*e* shows an example how an individual user enriches and strengthens further the information network comprising several linked items and attributes of three decision making applications that are depicted in FIG. 3*d*. User based links are shown by solid lines between items and attributes in FIG. 3*e*. In this example the user has utilized Application 1, Application 2 and Application 3. Although some of the attributes used are utilized in different context they may give answers to a particular question.

An individual user of a particular decision making application creates the information network of FIG. 3*e* by saving his or her answers to a user specific database (reference 13*c* in FIG. 2*a*). The user specific database 13*c* advantageously includes also answers from other decision making applications that the same user has used. The given answers to questions of different decision making applications make thereby links between items, between attributes and between items and attributes. This way an individual user enriches his or her own existing data network that is saved in his or her user specific database 13*c*.

When an individual user saves his or her answers to different questions of a particular decision making application he or she creates a relationship between the questions (i.e. via creating attribute values to the items). This relationship may be described with if/then conditions. For example a user who likes modernity may prefer also minimalism.

When a user has made decisions about several items he or she creates relationship between items of a particular decision making application. Same user may like different items. This link can be used for example to recommendation purposes.

In the corresponding way when the user has made different kinds of decisions by answering questions, he or she has generated attribute values that may be attached to items. This relationship can be described with if/then conditions. For example users who have sports cars prefer generally extreme sports.

The user made information network of one particular decision making application may advantageously also be saved to the Application specific database 13*b* and the Global database 13*a*. However, the data contained in the information network of user specific database 13*c* is saved anonymously to the Global database 13*a*.

The savings of users of decision making applications to the Global database 13*a* create one kind of community of decision making application users that a particular user may exploit when he or she has a new a decision making situation. In the Global database 13*a* an item that may have different attribute values in different decision making applications has only one attribute value that is calculated from the attribute values of all decision making applications. This attribute value is called in this application a global attribute of the item in question.

From global attribute values of items having at least one common feature may be converted a set of local attribute values for a limited set of items from the Global database 13*a*.

Data of several decision making application networked via links between item and attributes in the global database.

FIGS. 4*a* and 4*b* show an example how Global attribute values are defined for items that are included in three different decision making Applications 1, 2 and 3.

In this example we have 3 different applications using same attribute 19 (size) as a decision factor. The utilized three applications have some same items as a decision objects. Item 63 can be found in application 1 and 2. Item 84 can be found in applications 2 and 3. The three decision making applications in this example are as follows.

Application 1 is "Home pet choice engine", which includes different kind of pets sized from mice (Item 23) to cats (Item 63). In Application 1 the size of the pets is a decision factor (i.e. an attribute value based on the size of a pet).

Application 2 is "World cats favour engine", where also the same size attribute is used for feline. The Application 2 contains feline from home cats (Item 63) to wild cats like lion (item 84).

The Application 3 is "Safari animals to see choice engine", which includes big animals from lions (item 84) to elephants (item 5). Also in this decision making application 3 the same size attribute is used.

From the size attributes of these three decision making applications it is possible to calculate global attribute values where the order in size is mice<home cat<lion<elephant.

In this example in Application 1 the mouse (item 23) has size attribute value 0.2 and the cat (item 63) has a size attribute value 0.8.

In Application 2 the situation has changed. The cat (item 63) has now a size attribute value 0.23 when lion (item 84) has a size value 0.85.

In Application 3 the situation has changed again. The lion (item 84) has now a size attribute value 0.19 when the elephant (item 5) has a size value 0.9.

From the size attributes 19 of these three decision making applications it is possible to calculate one global attribute value for each item. The attribute value of the biggest animal elephant (item 5) does not have to change in the global attribute scale. Therefore, the global size attribute of the elephant (item 5) may be 0.9. The second biggest animal lion (item 84) may also retain its size attribute 0.19 of Application 3 as a global attribute. In this example the size attributes of animals included only in Application 1 or Application 2 change. The transformation factors by which global attribute value for item 23 is calculated in this example are formulas (1), (2), (3), (4) and (5).

For example for item 23 the global attribute calculation may be as follows:

$$\text{attribute value in Application 1} * \text{factor 1} = \text{attribute value in Application 2} \quad (1)$$

$$\text{attribute value in Application 2} * \text{factor 2} = \text{attribute value in Application 3} \quad (2)$$

i.e. the global attribute value = 
item 23 attribute value × factor 1 × factor 2  (3)

where:

$$\text{factor 1} = \frac{(\text{attribute value of item 63 in Application 2})}{(\text{attribute value of item 63 in Application 1})} \quad (4)$$

[item 63 common in Applications 1 and 2]

$$\text{factor 2} = \frac{(\text{attribute value of item 84 in Application 3})}{(\text{attribute value of item 84 in Application 2})} \quad (5)$$

[item 84 common in Applications 2 and 3]

By the formulas (1), (2), (3), (4) and (5) size attributes of item 23 and item 63 are converted to size attributes that are usable in the scale of Application 3. The calculated size attributes of items 23 and 63 together with the original size attributes of items 84 and 5 in the scale of Application 3 creates the global attributes of items 23 (mouse), 63 (cat), 84 (lion) and 5 (elephant).

In this example the global attributes are as follows: item 23 (mouse) 0.013, item 63 (cat) 0.051, item 84 (lion) 0.19 and item (5) 0.9. Now the animals of three different decision making application are converted on one scale having one numerical value between 0 and 1.

From the global attributes of items it is possible to convert local attributes for a portion of items included in the Global database. The portion of items is a sub-group of items of the Global database. In the set of converted local attributes of the sub-group the item having the smallest global attribute value can be set for example to a new local attribute value 0. The item having the biggest attribute value can be set for example to a new local attribute value 1. The attribute values of items that have in the global database attribute values between the smallest attribute value and biggest attribute value are calculated for example by formula (6):

$$\left[ \frac{\left[ \left( \text{global attribute value of the item} - \text{smallest global attribute value of the sub-group} \right) \right] \times 1}{\text{largest global attribute value of the sub-group} - \text{smallest global attribute value of the sub-group}} \right] \quad (6)$$

By formula (6) the local attribute values of the items of the selected sub-group are advantageously converted to be in a scale ≥0 and ≤1. However, the invention is not limited to the above-mentioned numerical scale. The utilized scale may also be some other scale between two case-specific numerical end values.

If items 23 (mice), item 63 (cat) and item 84 (lion) make up a new local group of items then item 84 will have a new local attribute value 1 and item 23 will have a new local attribute value 0. When formula (6) is applied to item 63 it will have a new local attribute value 0.215. In that way a new set of local attributes of selected items is on hand.

Some Use Cases:

In decision making the depicted data network model may be utilized in all kinds of decision-making situations. It can help to choose right products, to choose the right candidate, to make more educated decisions overall.

Networked data of the Global database 13*a* offers better ways to use information without answering all questions by using existing data from other users or decision making applications.

Let's consider a situation where a user is looking for a vacuum cleaner. The user knows many interesting vacuum cleaners. Let us assume that suction force is the most important factor to the user. With networked data and global & local values according to the invention the user can pick any interesting item and compare it to his or her current item and use an evaluation scale he or she likes. Usually the best evaluation scale would be "market low" and "market high". User can also attach other known items to the scale to tell more about the scale used.

Networked data of the Global database 13*a* offers endless ways to have insights about things and people. It can be used to look trends and patterns about human behavior. For example a user does a satisfaction survey to his or her customers. With networked data of the Global database 13*a* he or she can use related other attributes in his or her report as well. Another example; product developers can easily explore current market and do decisions based on existing items and users' opinions/needs.

Networked data of the Global database 13*a* offers numerous ways to create recommendations to users about what they might want, what they might like or what they might already have. For example: A user has answered 200 different questions and thus generated attributes about him or her. When there are other users with answers to same questions this data can be used with clustering algorithms to find similar other users. As users have told their current or interested items, this connection can be used to recommend user what he or she might be interested in. Because other similar users have answered other questions (that the current user has not yet given an answer to) these answers may be used to recommend readymade answers to user.

Networked data of the Global database can be used to understand things and relationships between them. Any new item can be compared to existing items and see differences. For example when a user sees a new item that he or she does not recognize then the user can explore data network of this item in the Global database. He or she can see attributes of this item and also connections to other items.

The networked data in the Global database makes it possible to search things and opinions from networked data of the Global database. All items have attribute values and that attribute value may be used for matching or just sorting purposes. A user can do a search by just telling what he or she is searching for and add attributes he is interested in.

Figure 5:
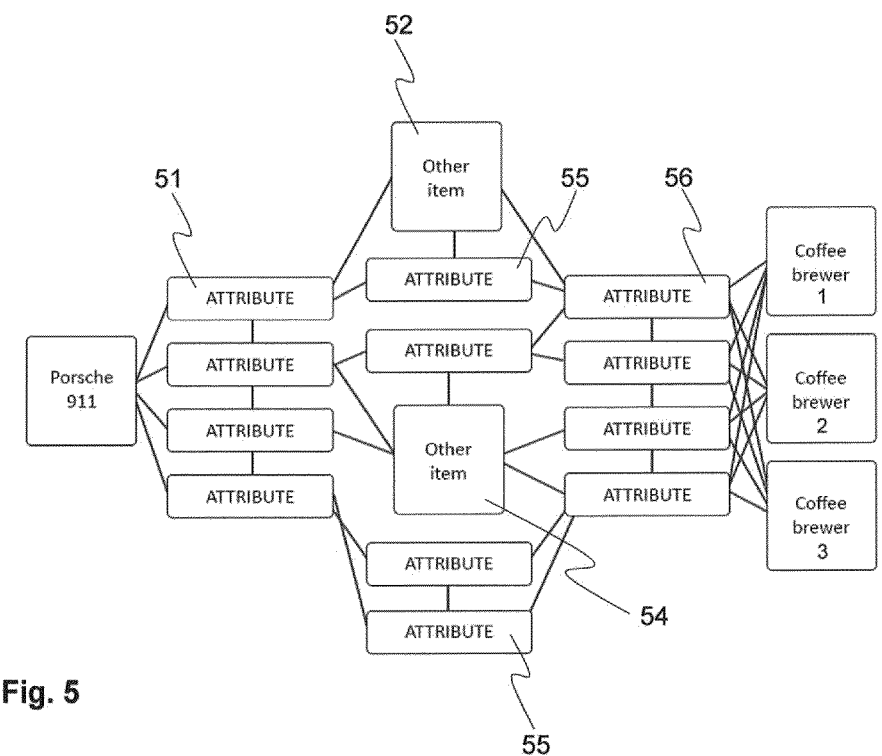
FIG. 5 shows as an example how a decision making application may be created from data of the global database.

A search example is shown in FIG. 5. A user is looking for coffee brewer. He or she can type "Coffee brewer" and use attributes he or she likes: "Easiness to use", "Automation", "Size", "White", "Modern", etc. Then he or she might use sliders to make these attributes more specific. A search engine will then utilize these attributes as search factors.

The user can also do more intelligent searches in the networked data of the Global database. If the user for example likes Porsche 911 he or she might use it as a descriptive search factor of a coffee brewer. "I like to have coffee brewer that is like Porsche 911". Item Porsche 911 has in the Global database 13*a* a group of exemplary attributes 51. These attributes 51 are also attributes of other items 52 and 54 disclosed in the Global database. The items 52 and 54 have also a group of other attributes 56. The group of attributes 56 are also attributes of three coffee brewer models 1, 2 and 3. Some of the attributes 56 have links to a group of at tributes 55 which on the other hand has a link to the group of attributes 51.

Even if Porsche 911 does not have any same attributes 51 with attributes 56 of the coffee brewers 1, 2 and 3, the connecting links via attributes 55 or items 52 and 54 may be used for finding a coffee brewer having features that resemble Porsche 911.

Figure 6A:
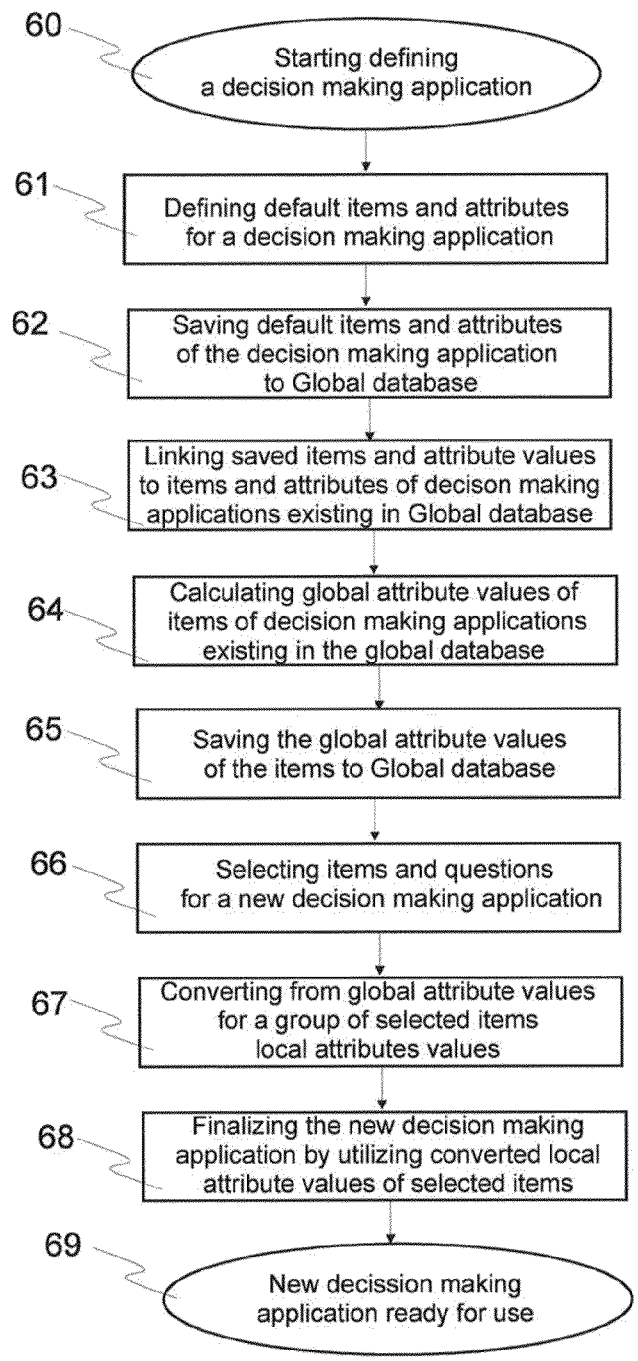
FIG. 6a shows as an exemplary flow chart the functional main steps of creating a new decision making application by utilizing the enriching method according to the invention.

FIG. 6a shows as an example a flow chart how enriching of global attributes associated to items of a first decision making application that is saved in a global database may be utilized for speeding up creation of a second decision making application utilizing already existing items with their attributes.

In phase 60 the creator of a first decision making application starts his or her work for defining an application specific default database; which comprises items and questions to be used in the first decision making application, on a suitable data processing device 14.

In phase 61 the application creator of the first decision making application selects items and questions to be utilized in the decision making application. In this phase the application creator select at least one proper evaluation frame. In this work the application creator may advantageously use one-dimensional evaluation line, two-dimensional evaluation frame or a multiple choice question frame or a combination of them. The application creator also advantageously defines default attributes to questions to be answered utilizing selected evaluation frame. Defining a default attribute to an item makes a link between them.

In phase 62 the selected items, questions concerning the items and default attributes associated to the items are saved anonymously to Global database 13a according to the invention. At the same time the selected items and default attributes associated to the items may be saved also to a user specific database 13c and/or anonymously to Application database 13b of the decision making application owner.

In phase 63 the saved default items and attributes of the created new decision making application are linked to corresponding items and attributes of other decision making applications whose item and attribute data already exist in Global database 13a. Application creator may contribute to the linking process and setting of initial global values by answering questions if default values of items are higher or smaller than randomly picked other items with same attribute on the Global database. This linking enriches the already existing networked data in Global database 13a.

In phase 64 for each particular item existing in Global database 13a a global attribute value is calculated by utilizing formulas (1), (2), (3), (4) and (5). The calculation of global attributes may advantageously be accomplished every time when data from a new decision making application is added to Global database 13a.

In phase 65 the calculated global attribute values of the items are advantageously saved in Global database 13a.

In phase 66 a creator of the second decision making application starts his or her work for defining an application specific default database, which comprises items and questions to be used in the second decision making application, on a suitable data processing device 14. The creator may in his or her work utilize also the items included in Global database 13a by selecting a particular sub-group of items from the items of the Global database 13a. Each of the selected items of the sub-group has its own global attribute value that depicts a particular feature that is common to the items of the selected sub-group.

In phase 67 for the selected items of the sub-group local attribute values are defined. A selected item with the smallest global attribute value in the sub-group may for example be set a local attribute value 0. The selected item with the biggest global attribute value in the sub-group may for example be set a local attribute value 1. The local attribute values of remaining items of the sub-group are calculated by utilizing formula (6), for example.

In phase 68 a new decision making application may be finalized by selecting preferred attributes defined in phase 67 for use and by creating new attributes if needed.

In phase 69 the created new decision making application is ready for use and is saved to the Global database as in phase 62.

Figure 6B:
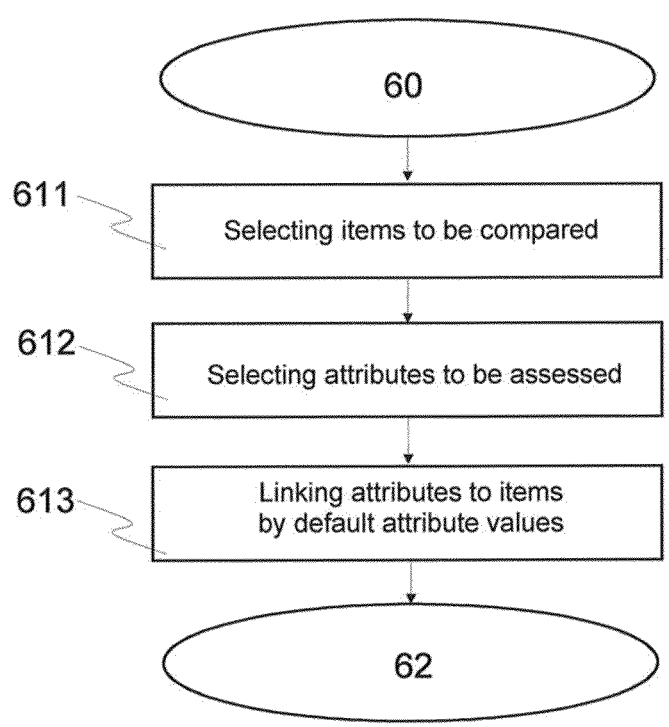
FIG. 6b shows as an exemplary flow chart the functional main steps of creating global database.

FIG. 6b shows a flow chart comprising the main steps that are accomplished in phase 61 in FIG. 6a.

In phase 611 the items to be compared in the decision making application against each other are selected.

In phase 612 the attributes to be assessed are selected. This phase advantageously includes formulation of questions to be asked for getting a user evaluation.

In phase 613 the selected items and attributes to be assessed are linked together. This may be accomplished by giving at least one default attribute value to the attribute of the item in question.

The process steps described in FIGS. 6a and 6b to be implemented in the development platform can be implemented with computer program commands, which are executed in a suitable general-purpose or special-purpose processor. The computer program commands can be stored in a computer-readable media, such as a data disk or a memory, from where the processor of the data processing device can retrieve said computer program commands and execute them. The references to computer-readable media can for example also contain special components, such as programmable USB Flash memories, logic arrays (FPLA), application-specific integrated circuits (ASIC) and signal processors (DSP).

Some advantageous embodiments of the method and device according to the invention have been described above. The invention is not limited to the solutions described above, but the inventive idea can be applied in numerous ways within the scope of the claims.

What is claimed is:

1. A method for enriching comparison data of decision making applications, by which an application user makes decisions by utilizing at least one evaluation frame, the method comprising:
    defining in a development environment implemented on a processor unit a first decision making application by defining an application specific default database by:
        selecting attributes to be assessed;
        selecting items to be compared;
        linking the attributes to the items by default attribute values; and
        saving the defined default database of the first decision making application to a global database;
    in the global database:
        calculating with the processor unit global attribute values to items from linked default attribute values of said items of decision making applications included in the global database, wherein the global attributes of items are defined from their original attribute values as follows:
            an item having the biggest attribute value of all items of all decision making applications in a utilized scale retains its original attribute value as the global attribute value or is set to a specific attribute value;

items originating from the same decision making application as the item having the biggest global attribute value retain their original attribute values, or get attribute values that are proportional to the specific attribute value of the item having the biggest attribute value, as their global attribute value;

global attribute values of other items of other decision making applications are defined by multiplying the original attribute value by at least one factor where each of the factors are defined by one common item of two decision making applications by dividing a smaller attribute value of said item of a decision making application by a bigger attribute value of the same item of another decision making application; and converting with the processor unit from the global attribute values at least one local attribute to be included in a second decision making application, which has at least one attribute or item linked to an existing attribute or item in the global database, thereby speeding up creation of the second decision making application.

2. The method according to claim 1, wherein both original attributes and global attributes of items have one numerical attribute value in a scale from 0 and 1.

3. The method according to claim 1, wherein local attributes of a sub-group of items from the items of the global database are converted as follows:

an item having the smallest global attribute value gets a local attribute value that is ≥0;

an item having the biggest global attribute value gets a local attribute value that is bigger than the local attribute value of the item having the smallest global attribute value; and local attribute values of other items of said sub-group that have global attribute values between the smallest global attribute value and biggest global attribute value are calculated by formula:

$$\left(\frac{\left[\left(\begin{array}{c}\text{global attribute value of the item} - \\ \text{smallest global attribute value of the sub-group}\end{array}\right)\right] \times 1}{\text{largest global attribute value of the sub-group} - \text{smallest global attribute value of the sub-group}}\right).$$

4. The method according to claim 3, wherein a new decision making application with items and attributes associated with the items is created by the selection of the sub-group.

5. A Server comprising:
a processor unit;
a memory unit;
input and output means, and;
a user interface;
the processor unit and the memory unit configured to implement a development environment that is configured at least to:
define an application specific default database of a first decision making application by:
enabling selection attributes to be assessed;
enabling selection items to be compared;
enabling linking the attributes to the items by default attribute values; and
enabling saving the defined default database of the first decision making application to a global database;

calculate global attribute values to items from linked default attribute values of said items of decision making applications included in the global database;

retain original attribute value of an item having the biggest attribute value o all items of all decision making applications or set said attribute value to a specific attribute value;

retain original attribute values of items originating from the same decision making application as the item having the biggest global attribute value or scale said attribute values to be proportional to the specific attribute value of the item having the biggest global attribute value; and define global attribute values of other items originating from other decision making applications by multiplying the original attribute value by at least one factor where each of the factors are defined by one common item of two decision making applications by dividing a smaller attribute value of said common item of a decision making application by a bigger attribute value of the same common item of another decision making application; and convert from the global attributes at least one local attribute to be included in a second decision making application, which has at least one attribute or item linked to an existing attribute or item in the global database, thereby speeding up creation of the second decision making application.

6. The server according to claim 5, wherein the server is configured to define one numerical attribute value in the scale from 0 and 1 to original attributes and global attributes of items.

7. The server according to claim 5, wherein the server is configured to convert local attributes of a sub-group of items from the items of the global database by:

giving to an item having the smallest global attribute value a local attribute value that is ≥0;

giving to an item having the biggest global attribute value a local attribute value that is bigger than the local attribute value of the item having the smallest global attribute value; and defining local attribute values of other items of said sub-group that have global attribute values between the smallest global attribute value and biggest global attribute value by formula:

$$\left(\frac{\left[\left(\begin{array}{c}\text{global attribute value of the item} - \\ \text{smallest global attribute value of the sub-group}\end{array}\right)\right] \times 1}{\text{largest global attribute value of the sub-group} - \text{smallest global attribute value of the sub-group}}\right).$$

8. The server according to claim 5, wherein the server is configured to create a new decision making application by the selection of the sub-group with selected items and associated attributes.

9. A computer-readable, non-transitory data storage medium comprising computer executable components for enriching comparison data of decision making applications, the computer executable components comprising:

computer readable code for defining a first decision making application by defining an application specific default database by:
selecting attributes to be assessed;
selecting items to be compared;

linking the attributes to the items by default attribute values; and saving the defined default database of the first decision making application to a global database;

computer readable code for calculating global attribute values to items from linked default attribute values of said items of decision making applications included in the global database wherein the global attribute values are defined from their original attribute values as follows:

an item having the biggest attribute value of all items of all decision making applications in a utilized scale retains its original attribute value or is set to a specific attribute value;

items originating from the same decision making application as the item having the biggest global attribute value retain their original attribute values, or get attribute values that are proportional to the specific attribute value of the item having the biggest attribute value, as their global attribute value;

global attribute values of other items of other decision making applications are defined by multiplying the original attribute value by at least one factor where each of the factors are defined from one common item of two decision making applications by dividing a smaller attribute value of said item of a decision making application by a bigger attribute value of the same item of another decision making application; and computer readable code for converting from the global attribute values at least one local attribute to be included in a second decision making application, which has at least one attribute or item linked to an existing attribute or item in the global database, thereby speeding up creation of the second decision making application.

10. The computer-readable non-transitory data storage medium according to claim 9, comprising computer readable code for assigning to original attributes and global attributes of items one numerical attribute value in the scale from 0 and 1.

11. The computer-readable non-transitory data storage medium according to claim 9, comprising computer readable code for converting local attributes of a sub-group of items from the items of the global database by:

giving to an item having the smallest global attribute value a local attribute value that is ≥0;

giving to an item having the biggest attribute value a local attribute value that is bigger than the local attribute value of the item having the smallest global attribute value; and defining local attribute values of other items of said sub-group that have attribute values between the smallest global attribute value and biggest global attribute value by formula:

$$\left( \frac{\left[ \left( \frac{\text{global attribute value of the item} - }{\text{smallest global attribute value of the sub-group}} \right) \times 1 \right]}{\text{largest global attribute value of the sub-group} - \text{smallest global attribute value of the sub-group}} \right).$$

12. The computer-readable non-transitory data storage medium according to claim 9, comprising computer readable code for creating by the selection of the sub-group a new decision making application with the selected items and attributes associated with the items.

13. A database stored on a non-transitory data storage medium, the database comprising:

a plurality of items of decision making applications each item representing an object included in a comparison process;

a plurality of attributes of the items with associated default attribute values;

a plurality of links between items and associated attributes;

a plurality of global attribute values of the items that are defined from the default attribute values of the items;

wherein the global attribute values are defined from their original attribute values as follows:

an item having the biggest attribute value of all items of all decision making applications in a utilized scale retains its original attribute value or is set to a specific attribute value:

items originating from the same decision making application as the item having the biggest global attribute value retain their original attribute values, or get attribute values that are proportional to the specific attribute value of the item having the biggest attribute value, as their global attribute value;

global attribute values of other items of other decision making applications are defined by multiplying the original attribute value by at least one factor where each of the factors are defined from one common item of two decision making applications by dividing a smaller attribute value of said item of a decision making application by a bigger attribute value of the same item of another decision making application; and a plurality of local attribute values of a sub-group of items of the database, which local attribute values are defined from the global attribute values of all items; whereby a creation of a decision making application is speeded up by utilizing the defined local attributes of items in a decision making application development environment.

* * * * *